United States Patent
Di Crescenzo

(10) Patent No.: US 8,387,126 B2
(45) Date of Patent: Feb. 26, 2013

(54) SYSTEMS AND METHODS FOR AUTHENTICATING A SERVER BY COMBINING IMAGE RECOGNITION WITH CODES

(75) Inventor: Giovanni Di Crescenzo, Madison, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 451 days.

(21) Appl. No.: 12/637,169

(22) Filed: Dec. 14, 2009

(65) Prior Publication Data

US 2011/0145901 A1 Jun. 16, 2011

(51) Int. Cl.
*G06F 7/04* (2006.01)
(52) U.S. Cl. .......................... 726/9; 713/172
(58) Field of Classification Search .................. 726/2, 7, 726/9; 713/168, 176, 172, 159
See application file for complete search history.

(56) References Cited

U.S. PATENT DOCUMENTS

| 7,269,852 | B2 * | 9/2007 | Uemura et al. ................. 726/26 |
| 7,770,002 | B2 * | 8/2010 | Weber ........................... 713/159 |
| 2004/0225880 | A1 | 11/2004 | Mizrah | |
| 2008/0013832 | A1 | 1/2008 | Lev | |
| 2008/0082821 | A1* | 4/2008 | Pritikin ........................ 713/169 |
| 2008/0098464 | A1 | 4/2008 | Mizrah | |
| 2010/0158327 | A1 | 6/2010 | Kangas et al. | |

OTHER PUBLICATIONS

Jim Youll, "Fraud Vulnerabilities in SiteKey Security at Bank of America", Jul. 18, 2006, pp. 1-15.*
PCT International Search Report, Feb. 2, 2011.
Ebay Toolbar, http://pages.ebay.com/ebay_toolbar/, accessed Dec. 4, 2009, 1 page.
SiteKey system, Bank of America, http://www.bankofamerica.com/privacy/index.cfm?template=sitekey, accessed Dec. 4, 2009, 1 page.
Rachna Dhamija et al., "Phish and HIPs: Human Interactive Proofs to Detect Phishing Attacks", May 25, 2005, 15 pages.
Voice-Over-Internet Protocol System, Skype, http://www.skype.com/, accessed Dec. 4, 2009, 1 page.

* cited by examiner

*Primary Examiner* — Samson Lemma
(74) *Attorney, Agent, or Firm* — Philip J. Feig

(57) ABSTRACT

A system and method is provided for authenticating a first device to a second device. This involves providing images to the second device, receiving an indication of selected ones of the images as authenticating images, and identifying an authenticating code associated with the second device. This also involves receiving a transaction request from the second device, the first device providing a display page to the second device, the display page including the authenticating images at locations identified by the authenticating code.

18 Claims, 3 Drawing Sheets

SYSTEMS AND METHODS FOR AUTHENTICATING A SERVER BY COMBINING IMAGE RECOGNITION WITH CODES

BACKGROUND

1. Technical Field

Disclosed embodiments relate to the field of computer processing and communications. In particular, systems and methods are disclosed for authenticating an electronic communications partner.

2. Description of the Related Art

Communication among electronic devices is widespread and can take many forms. In some cases a client computer communicates with a server computer to enter into a transaction. The transactions may be sensitive in nature and may involve accessing a password protected account on the server. For example, a user may use an electronic device to connect to a server in order to access a bank account and conduct online banking transactions. In other cases, peer devices may communicate with each other to share files, chat, or conduct voice over IP (VoIP) telephone calls.

In electronic communication, a danger exists of a third party impersonating one of the communicating parties. If a third party is able to successfully impersonate one of the communicating parties, then the third party may be able to access private information, such as bank account passwords, credit card information, or any other private information that is electronically communicated.

FIG. 1 illustrates a system 100, in which a third party is able to access private information in electronic communication. System 100 includes sender 102, intended receiver 104, and impersonating receiver 106. Sender 102, intended receiver 104, and impersonating receiver 106 are computing devices that are electrically or optically connected to each other, for example, by a computer network.

Sender 102 may be a client computer attempting to login to intended server 104, which may be a server at a bank that can perform bank transactions, for example. As such, sender 102 sends a communication 108 to intended receiver 104. In the absence of impersonating receiver 106, intended receiver 104 would receive intended communication 110. Intended communication 110 is shown as a dotted line in FIG. 1, because it may never reach intended receiver 104, and is intercepted by impersonating receiver 106.

Impersonating receiver 106 receives intercepted communication 112 from sender 102. Impersonating receiver 106 establishes a bidirectional communication link 114 with sender 102 by pretending to be intended receiver 104. Intended receiver 104 may not know that sender 102 attempted to communicate with it.

For example, if a user of sender 102 was logging into her bank account, she may direct her browser to go to the web address of her bank, which should enable her to access intended receiver 104. Impersonating receiver 106 may intercept that communication, and respond with a webpage, which looks similar to the web page that intended receiver 104 would normally provide. The user at sender 102 may then provide her user name and password information to impersonating receiver 106, mistakenly thinking that she is providing this information to intended receiver 104. Impersonating receiver 106 may then capture the user name and password information, and then would have full access to the users bank account.

One solution that has been proposed, is for the user and intended receiver 104 to agree on an authenticating symbol at registration. This way, when the user accesses intended receiver 104, intended receiver 104 sends back the agreed upon authenticating symbol. By contrast, if impersonating receiver 106 intercepted the communication and sent a webpage to sender 102, the webpage would not include the authenticating symbol, because impersonating server 106 would have no knowledge of the authenticating symbol. If the webpage received at sender 102 does not include the authenticating symbol, then the user knows that its communication partner cannot be trusted, and she can refrain from providing her sensitive information. In this way, the user can authenticate that she is communicating with intended receiver 104 and not impersonating receiver 106.

There are at least two standard solutions from the Cryptography literature. The first one is based on first setting a public-key infrastructure (PKI) and then using certificates released by a Certification Authority (CA). For instance, when a client visits a website with a computer, the client is often guaranteed that the website she is visiting is authentic (as opposed to being a counterfeit copy from an impostor) by the fact that the client browser verified the website's certificate, released by a trusted CA (e.g., Verisign).

Such techniques are considered very secure but are also well known to rate poorly in terms of usability, as they are hard to deploy (not all networks can afford to setup a PKI), hard to maintain (if not periodically managed, the above verification won't work), and such verifications are often ignored by users who visit the website even after being notified that the verification was not successful (i.e., if the website's certificate expired).

Browser phishing filters detect whether a web site being visited has features similar to known "phish" web site; meaning a web site that are put up by an impostor rather by the entity claimed in the web site. Such method perform relatively well in terms of usability as not much is needed by a user to maintain such filters, but are well-known to rate poorly in terms of security, as skilled impostors understand how to overcome such filters. A well-known example is the E-bay toolbar using the Account Guard method.

Recent techniques making a huge step towards solving the problem include Bank of America's SiteKey system and variants of it, which work as follows: the user provides the server with a shared secret, such as an image or passphrase, in addition to her regular password. The server shows this shared secret to the user, who is asked to recognize it before providing the server with her password. The biggest weakness of this scheme is that the server must display the shared secret in order to authenticate itself to the user. If the secret is observed or captured, the image can be replayed by an impostor which would then be able to fool the user. Still, such schemes are today used by essentially anyone having on-line access to her bank account. Other shortcoming of these schemes are discussed in the paper "Phish and HIPs: Human Interactive Proofs to Detect Phishing Attacks," by Dhamija et al.

One drawback with the Bank of America solution is the possibility of impersonating receiver 106 learning of the authenticating symbol. This could happen at sender 102, if someone sees the authenticating symbol on a display screen of sender 102, known as a "spying attack" or a "shoulder attack," Alternatively, impersonating receiver 106 may monitor communication between sender 102 and intended receiver 104 over time, to determine the authenticating symbol.

SUMMARY

In accordance with the invention, there is provided a method for authenticating a first device to a second device, the method comprising the steps of: providing images to the second device; receiving from the second device an indication of selected ones of the images as authenticating images; identifying an authenticating code associated with the second device; receiving a transaction request from the second device; and the first device providing a display page to the second device, the display page including the authenticating images at locations identified by the authenticating code.

In accordance with the invention, there is further provided a system for device authentication, the system comprising first and second devices, wherein: the first device including a processor configured to execute program instructions to: provide images to a second device; receive an indication of selected ones of the images as authenticating images; identify an authenticating code associated with the second device; receive a transaction request from the second device; and provide a display page to the second device, the display page including the authenticating images at locations identified by the authenticating code; the second device including a processor configured to execute program instructions to: receive the images from the first device; select the authenticating images from among the images; identify the authenticating images to the first device; send the transaction request to the first device; and receive the display page from the first device.

It is important to understand that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Reference will now be made in detail to exemplary embodiments of the present invention, examples of which are illustrated in the accompanying drawings. Whenever possible, the same reference numbers will be used throughout the drawings to refer to the same or like parts.

Figure 1:
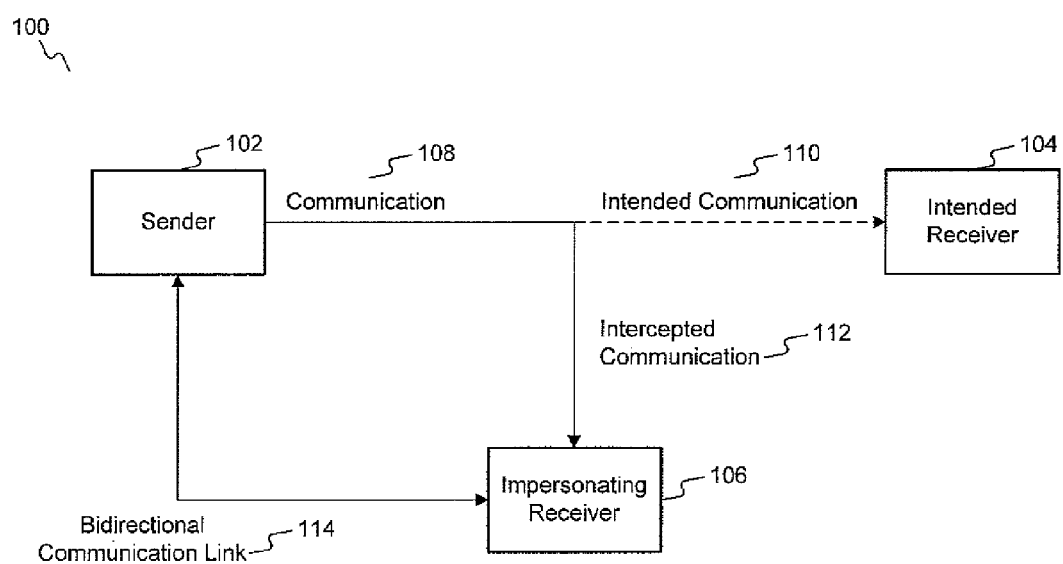
FIG. 1 illustrates a system in which a third party is able to access private information in electronic communication.
Figure 2:
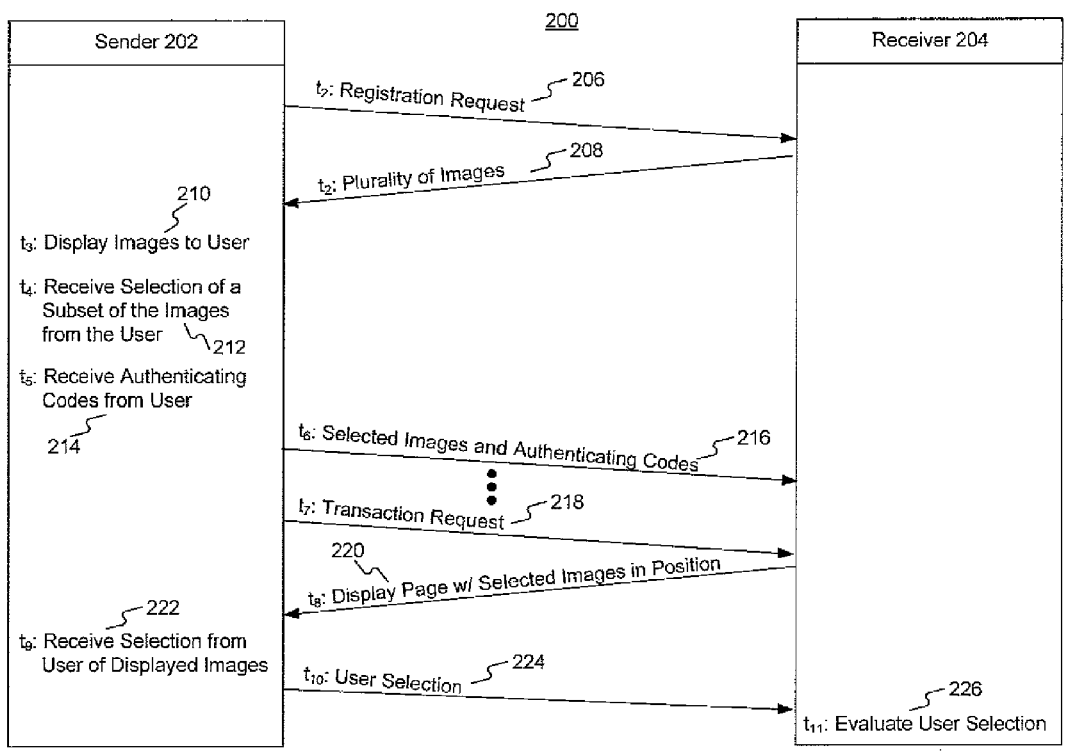
FIG. 2 illustrates a flow diagram of communication between a sender and a receiver.

FIG. 2 illustrates a flow diagram 200 of communication between a sender 202 and a receiver 204. Sender 202 and receiver 204 may be electronic devices including one or more from the group of: a client, a server, a desktop computer, a laptop computer, a netbook, a PDA, or any other electronic device. Sender 202 and receiver 204 may each include at least one processor configured to execute program instructions stored on at least one computer readable medium. Sender 202 and receiver 204 may each include input ports and output ports configured to communicate with each other by any type of connection, including directly, indirectly, or via a network. Sender 202 and receiver 204 may be individual computing devices, or may be distributed across multiple computing devices. Alternatively, sender 202 and receiver 204 may execute on the same device.

At a time sender 202 may send a registration request to receiver 204 (step 206). The registration request may enable sender 202, and/or a user of sender 202, to register for a service provided by receiver 204. For example, the registration request may enable the user at sender 202 to register for online banking, which may be a service provided by receiver 204.

At a time $t_2$, receiver 204 may send or provide a plurality of images to sender 202 (step 208). At a time $t_3$, sender 202 may display the plurality of images to a user of sender 202 (step 210). At a time $t_4$, sender 202 may receive a selection of or select a subset of the displayed images from the user (step 212). For example, from the plurality of displayed images, the user may select three images, a basketball, a pumpkin, and a rabbit. Next, at a time $t_5$, the user may input an authenticating code to sender 202 (step 214). For example, the user may input three integers, 9, 1, and 0 as the authenticating code. The selected images and the authenticating code may be a shared secret between sender 202 and receiver 204, so that sender 202 may authenticate receiver 204 in the future.

The authenticating code may be a set of integers entered by a user. The user may enter one integer for each of the images selected by the user. For example, if the user selected 3 of the plurality of images, then the user may also enter 3 integers. Each of the integers may correspond to one of the selected images. In some embodiments, the integers may be selected from the set {0-9}.

At time $t_6$, sender 202 sends an indication of the selected images and the authenticating code to receiver 204 (step 216). For example, sender 202 may indicate to receiver 204 that the user selected images of the basketball, the pumpkin, and the rabbit, and that the user input authentication code of 9, 1, and 0. This may conclude the registration of sender 202 with receiver 204. Later, at time $t_7$, sender 202 may send a transaction request to receiver 204 (step 218). For example, the user may direct sender 202 to access a website that is hosted by receiver 204. The website may be a homepage for a bank, at which the user may log in to access a bank account and to conduct banking transactions. The transaction request may include an identifier of sender 202 or the user. For example, the transaction request may include an account ID of the user. Alternatively or additionally, receiver 204 may read a cookie from sender 202 to identify an account associated with sender 202.

After identifying the user's account, receiver 204 may identify the images and authorization code sent by the sender previously at the time $t_6$ (step 216). These images the and authorization code may be a shared secret between sender 202 and receiver 204. At a time $t_8$, receiver 204 may send a display page to sender 202 (step 220). The display page may include the images previously selected at sender 202. The selected images may be placed on the display page among other images. The location of the selected images among the other images may be determined according to the authentication code. In this way, the displayed page reflects the shared secret information previously exchanged between server 202 and receiver 204.

For example, the display page may include images of the basketball, the pumpkin, and the rabbit among other images. The locations of the images of the basketball, the pumpkin, and the rabbit within the display page may be determined according to the authorization code 9, 1, and 0 that were previously entered by the user at sender 202. The other images may be fixed images that are displayed in the display page for every authentication attempt by receiver 204 to sender 202. The other images may alternatively be images that are randomly generated or selected by the receiver 204. In some embodiments, a first subset of the other images may be fixed, while a second subset of the other images may be randomly generated. Moreover, the other images may be generated or selected by the receiver 204 according to an algorithm.

At a time $t_9$, sender 202 may receive and display the display page (step 222). The user knows that receiver 204 is trustworthy if the display page reflects the shared secret information previously exchanged between sender 202 and receiver 204. The user may also be prompted to select the images, from among all of the images displayed, that she had previously selected (e.g., the basketball, pumpkin, and rabbit). Moreover, the user may be required to select the basketball, pumpkin, and rabbit from particular positions on the display page. To determine the appropriate positions, the user may need to reference the authentication code.

At a time $t_{10}$, sender 202 sends the user selection to receiver 204 (step 224). At $t_{11}$, receiver 204 evaluates the user selection, in order to determine whether or not sender 202 selected the correct images at the correct locations (step 226). For example, receiver 204 may determine if the user selected images of the basketball, pumpkin, and rabbit at locations corresponding to the authentication code 9, 1, and 0. Receiver 204 may permit the user to enter a password, or other sensitive information, upon a determination the user correctly selected the images.

In some embodiments the authentication code may be selected by the user only during the registration of server 202 with receiver 204. Alternatively, the user may renew the authentication code periodically. This may be beneficial, in the event that a third party monitors communication between sender 202 and receiver 204, in an attempt to learn the authentication code. Periodically renewing the authentication code may reduce the probability that a third party learns the current authentication code. In some embodiments, the user may enter a new authentication code with each transaction request. Moreover, in some embodiments, receiver 204 may supply the authentication code, instead of sender 202.

Some embodiments may include a static authentication code and a dynamic authentication code. The static authentication code may be determined at registration between server 202 and receiver 204, for example at steps 206-216 of FIG. 2. The static authentication code may be provided by either server 202 or receiver 204, and may be active as long as a user of server 202 is registered with receiver 204.

The dynamic authentication code may change frequently. For example, the dynamic authentication code may be updated every time the user seeks to enter into a transaction, and may be valid only for a particular transaction. The dynamic authentication code may be determined when server 202 requests a transaction with receiver 204, for example at steps 218-220 of FIG. 2. The dynamic authentication code may be provided by either server 202 or receiver 204.

Sender 202 may combine both the static authentication code and the dynamic authentication code to determine an authentication code. For example, sender 202 may perform a mathematical calculation, such as addition, concatenation, or a modulo operation, to the static and dynamic authentication codes to determine the authentication code. After determining the authentication code, the user of sender 202 may know where the selected images should be located on the display page provided by receiver 204 in the display page sent at step 220 of FIG. 2.

Some embodiments may incorporate biometric data of the user with the authentication code. For example, at registration, the user can speak the numbers 0-9, and sender 102 may transfer these voice samples to receiver 204. At some later time, receiver 204 may provide server 202 with a set of authentication codes, either a static authentication code or dynamic authentication code. If receiver 204 determines the authentication code to be 9, 1, and 0, receiver 204 may send voice samples of the user for those numbers to sender 202. Sender 202 may then audibly reproduce the numbers 9, 1, and 0, to the user, in the user's own voice. This may add additional assurance to the user that the user is interacting with a trusted communication partner in receiver 204.

Figure 3:
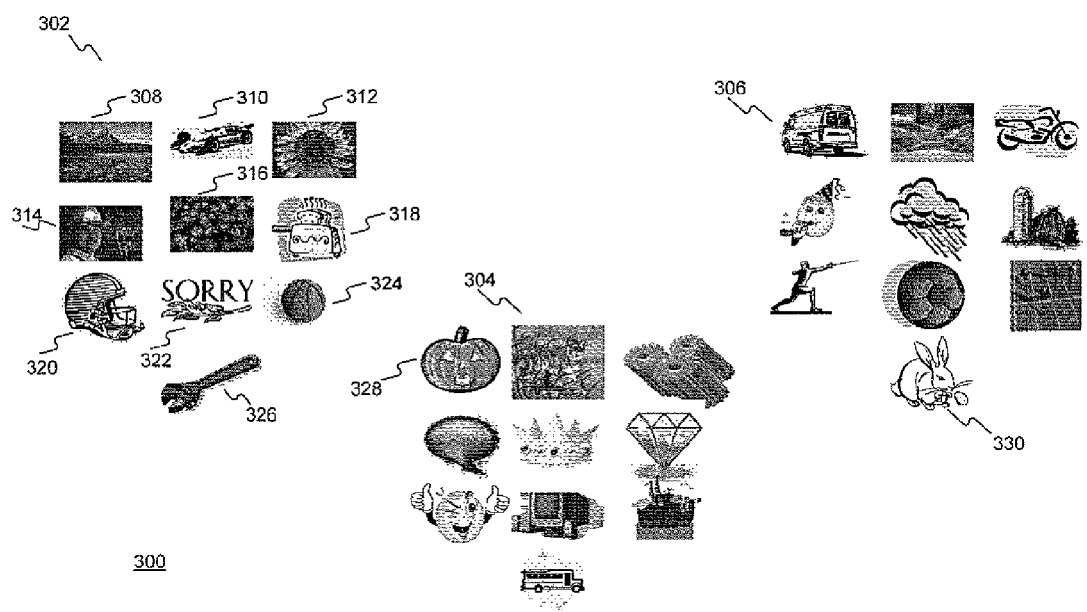
FIG. 3 illustrates an exemplary display page sent by a receiver to a sender, and displayed by the sender.

FIG. 3 illustrates an exemplary display page 300 sent by a receiver (such as receiver 204) to a sender (such as sender 202), and displayed by the sender. The sender may authenticate the receiver if display page 300 reflects shared secret information previously exchanged between the sender and the receiver during registration.

It is assumed that during registration, the user initially selected three images from a plurality of images presented by the receiver as a shared secret between the sender and the receiver. For example, the user may have selected a basketball, a pumpkin, and a rabbit. The user may have also selected the authentication code. The authentication code may have included three digits that would each correspond to one of the selected images. For example, the user may have selected the authentication code to be 9, 1, and 0. The selected images of the basketball, the pumpkin, and the rabbit, along with the authentication code of 9, 1, and 0, may have been sent by the sender to the receiver as the shared secret information during registration.

When the sender attempts to enter into a transaction with the receiver, such as by logging into a bank account hosted by the receiver, the receiver may first send display page 300 to the sender. Display page 300 may reflect the shared secret information to enable the sender to authenticate that receiver is the same receiver with which the sender previously registered. For example, display page 300 may include the basketball, pumpkin, and rabbit, among other images, at positions indicated by the authorization code, as the shared secret information.

In particular, display page 300 includes image sets 302, 304, and 306. Each of image sets 302, 304, and 306 take the shape of a telephone dial pad, in which numbers 0-9 are typically arranged. For example, for image set 302, image 308 corresponds to "1," image 310 corresponds to "2," image 312 corresponds to "3," image 314 corresponds to "4," image 316 corresponds to "5," image 318 corresponds to "6," image 320 corresponds to "7," image 322 corresponds to "8," image 324 corresponds to "9," and image 326 corresponds to "0." Image sets 304 and 306 are configured in a similar manner.

The sender may render display page 300 and prompt the user to select individual images, such as the basketball, pumpkin, and rabbit on the basis of the authentication code. If the basketball, pumpkin, and rabbit are arranged in display page 300 according to the authentication code, then the sender is able to authenticate the receiver.

Thus, the user may need to map a selected image to a location on display page 300 associated with a corresponding authentication code. For example, the user may associate the first selected image of a basketball with the first authentication code "9." Image set 302 displays an image 326 of a basketball at the $9^{th}$ position, since image set 302 is arranged as a dial pad would be arranged. Therefore, the user may select image 326. The user may also associate the second selected image of a pumpkin with the second authentication code "1." Therefore, the user may select image 328 from image set 304, which is an image of a pumpkin at the "1" position of a dial pad. The user may also associate the third selected image of a rabbit with the third authentication code "3." Therefore, the user may select image 330 from image set 306, which is an image of a rabbit at the $0^{th}$ position of a dial pad.

The presentation of display page 300 by the sender to the user, enables the user to authenticate the receiver. Display page 300 reflects shared secret information as images previously selected by the user, placed at locations that correspond to the authentication code entered by the user. Therefore, the user can confirm that display page 300 was sent by the receiver, because only the receiver would have knowledge of the selected image and authentication code.

The use of three selected images and the authorization code of length three is exemplary only and not limiting. Any number of images and authorization codes may be used. Moreover, the authorization code does not necessarily include numbers between 0-9, which are graphically mapped to a dial pad. Other types of codes may be used to designate a location on the display page. For example, letters may be used as the authorization code, with each letter corresponding to a location on the display page. Alternatively, numerals in hexadecimal format may be used as authorization code, and may be mapped to locations on the display page.

In some cases, devices may need to communicate with each other without registering beforehand. For example, it may be impractical for peer devices in a Voice over IP (VoIP) network to all register with each other before being able to place phone calls to one another. Accordingly, it may be beneficial to for a sending device to authenticate a receiving device without having to first register with the receiving device.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for authenticating a first device to a second device, the method comprising the steps of:
   providing images to the second device;
   receiving from the second device an indication of selected ones of the images as authenticating images;
   identifying an authenticating code associated with the second device comprising:
      identifying a static portion of the authenticating code during a preliminary communication with the second device;
      identifying a dynamic portion of the authenticating code during a subsequent communication with the second device; and
      combining the static portion of the authenticating code with the dynamic portion of the authenticating code to identify the authenticating code;
   receiving a transaction request from the second device; and
   the first device providing a display page to the second device, the display page including the authenticating images at locations identified by the authenticating code.

2. The method of claim 1, wherein the step of identifying the authenticating code further comprises the step of:
   receiving the authenticating code from the second device.

3. The method of claim 1, wherein the step of identifying the authenticating code further comprises the steps of:
   generating the authenticating code at the first device; and
   providing the authenticating code to the second device.

4. The method of claim 1, wherein the step of combining the static portion of the authenticating code with the dynamic portion of the authenticating code further comprises the step of:
   applying one of an addition function, a concatenation function, or a modulo function to combine the static portion of the authenticating code with the dynamic portion of the authenticating code.

5. The method of claim 1, the method further comprising the step of:
   receiving biometric samples from a user of the second device, the biometric samples corresponding to a set of possible authenticating codes;
   wherein the step of identifying a dynamic portion of the authenticating code further comprises the steps of:
   generating the dynamic portion of the authentication code at the first device; and
   providing the dynamic portion of the authenticating code to the second device as a subset of the biometric samples corresponding to the dynamic portion of the authenticating code.

6. The method of claim 5, wherein:
   the step of receiving the biometric samples further comprises the step of receiving voice samples from the user of the second device; and
   the step of providing the dynamic portion of the authenticating codes further comprises providing a subset of the voice samples that audibly identify the dynamic portion of the authenticating code.

7. A system for device authentication, the system comprising first and second devices, wherein:
   the first device including a processor configured to execute program instructions to:
      provide images to a second device;
      receive an indication of selected ones of the images as authenticating images;
      identify an authenticating code associated with the second device comprising program instructions to:
         identify a static portion of the authenticating code during a preliminary communication with the second device;
         identify a dynamic portion of the authenticating code during a subsequent communication with the second device; and
         combine the static portion of the authenticating code with the dynamic portion of the authenticating code to identify the authenticating code;
      receive a transaction request from the second device; and
      provide a display page to the second device, the display page including the authenticating images at locations identified by the authenticating code;

the second device including a processor configured to execute program instructions to:
receive the images from the first device;
select the authenticating images from among the images;
identify the authenticating images to the first device;
send the transaction request to the first device; and
receive the display page from the first device.

8. The system of claim 7, wherein the second device processor is further configured to execute program instructions to generate the authenticating code and to send the authenticating code to the first device.

9. The system of claim 7, wherein the first device processor is further configured to execute program instructions to generate the authenticating code, and provide the authenticating code to the second device.

10. The system of claim 7, wherein the first device processor is further configured to execute program instructions to apply one of an addition function, a concatenation function, or a modulo function to combine the static portion of the authenticating code with the dynamic portion of the authenticating code.

11. The system of claim 7, wherein:
the second device processor is further configured to execute program instructions to capture biometric samples from a user of the second device, the biometric samples corresponding to a set of possible authenticating codes, and to send the biometrics samples to the first device; and
the first device processor is further configured to execute program instructions to receive the biometric samples from the second device, to identify a subset of the biometric samples corresponding to the dynamic portion of the authenticating code, and to send an indication of the subset of the biometric samples to the second device.

12. The system of claim 11, wherein:
the second device processor is further configured to execute program instructions to capture the biometric samples as voice samples originating from the user of the second device; and
the first device processor is further configured to execute program instructions to identify the subset of the biometric samples as a subset of the voice samples that audibly identify the dynamic portion of the authenticating code.

13. A non-transitory computer-readable media comprising program instructions, which, when executed by a processor, cause the processor to perform a method for authenticating a first device to a second device, the method comprising the steps of:
providing images to the second device;
receiving an indication of selected ones of the images as authenticating images;
identifying an authenticating code associated with the second device comprising:
identifying a static portion of the authenticating code during a preliminary communication with the second device;
identifying a dynamic portion of the authenticating code during a subsequent communication with the second device; and
combining the static portion of the authenticating code with the dynamic portion of the authenticating code to identify the authenticating code;
receiving a transaction request from the second device; and
providing a display page to the second device, the display page including the authenticating images at locations identified by the authenticating code.

14. The non-transitory computer-readable media of claim 13, wherein the step of identifying the authenticating code further comprises the step of:
receiving the authenticating code from the second device.

15. The non-transitory computer-readable media of claim 13, wherein the step of identifying the authenticating code further comprises the steps of
generating the authenticating code at the first device; and
providing the authenticating code to the second device.

16. The non-transitory computer-readable media of claim 13, wherein the step of combining the static portion of the authenticating code with the dynamic portion of the authenticating code further comprises the step of:
applying one of an addition function, a concatenation function, or a modulo function to combine the static portion of the authenticating code with the dynamic portion of the authenticating code.

17. The non-transitory computer-readable media of claim 13, the method further comprising the step of:
receiving biometric samples from a user of the second device, the biometric samples corresponding to a set of possible authenticating codes;
wherein the step of identifying a dynamic portion of the authenticating code further comprises the steps of:
generating the dynamic portion of the authentication code at the first device; and
providing the dynamic portion of the authenticating code to the second device as a subset of the biometric samples corresponding to the dynamic portion of the authenticating code.

18. The non-transitory computer-readable media of claim 17, wherein:
the step of receiving the biometric samples further comprises the step of receiving voice samples from the user of the second device; and
the step of providing the dynamic portion of the authenticating codes further comprises providing a subset of the voice samples that audibly identify the dynamic portion of the authenticating code.

* * * * *

UNITED STATES PATENT AND TRADEMARK OFFICE
CERTIFICATE OF CORRECTION

| | | |
|---|---|---|
| PATENT NO. | : 8,387,126 B2 | |
| APPLICATION NO. | : 12/637169 | |
| DATED | : February 26, 2013 | |
| INVENTOR(S) | : Di Crescenzo | |

It is certified that error appears in the above-identified patent and that said Letters Patent is hereby corrected as shown below:

In the Specification

In Column 1, Line 64, delete "users" and insert -- user's --, therefor.

In Column 3, Line 42, delete "DESCRIPTION" and insert -- DETAILED DESCRIPTION --, therefor.

In Column 4, Line 6, delete "time" and insert -- time $t_1$, --, therefor.

In the Claims

In Column 10, Line 20, in Claim 15, delete "steps of" and insert -- steps of: --, therefor.

Signed and Sealed this
Eighteenth Day of November, 2014

Michelle K. Lee
*Deputy Director of the United States Patent and Trademark Office*